(12) United States Patent
LoCascio

(10) Patent No.: US 9,608,517 B2
(45) Date of Patent: Mar. 28, 2017

(54) SYSTEM AND METHOD TO ELIMINATE TRANSITION LOSSES IN DC/DC CONVERTERS

(71) Applicant: Maxim Integrated Products, Inc., San Jose, CA (US)

(72) Inventor: James Jason LoCascio, Mountain View, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 448 days.

(21) Appl. No.: 13/944,183

(22) Filed: Jul. 17, 2013

(65) Prior Publication Data

US 2015/0022167 A1 Jan. 22, 2015

Related U.S. Application Data

(60) Provisional application No. 61/821,385, filed on May 9, 2013.

(51) Int. Cl.
| | |
|---|---|
| *G05F 1/00* | (2006.01) |
| *H02M 3/155* | (2006.01) |
| *H02M 3/158* | (2006.01) |
| *H02M 1/00* | (2006.01) |

(52) U.S. Cl.
CPC .......... H02M 3/155 (2013.01); H02M 3/158 (2013.01); *H02M 2001/0054* (2013.01); *Y02B 70/1425* (2013.01); *Y02B 70/1491* (2013.01)

(58) Field of Classification Search
CPC ................ H02M 3/155; H02M 3/158; H02M 2001/0054; Y02B 70/1425; Y02B 70/1491

USPC ......... 323/259, 235, 351, 282; 363/124, 132
See application file for complete search history.

(56) References Cited

U.S. PATENT DOCUMENTS

| | | | | |
|---|---|---|---|---|
| 5,594,635 | A * | 1/1997 | Gegner ......................... | 363/124 |
| 5,774,346 | A * | 6/1998 | Poon ..................... | H02M 3/337 |
| | | | | 323/222 |
| 6,873,138 | B2 * | 3/2005 | Jacobson ................. | H01Q 3/30 |
| | | | | 323/232 |
| 8,379,421 | B2 * | 2/2013 | Nishijima ........... | H02M 1/4208 |
| | | | | 323/207 |
| 2007/0216390 | A1 * | 9/2007 | Wai et al. ..................... | 323/351 |
| 2009/0278513 | A1 * | 11/2009 | Bahramian ......... | H01L 21/8258 |
| | | | | 323/217 |
| 2011/0317452 | A1 * | 12/2011 | Anguelov ......... | H02M 3/33584 |
| | | | | 363/17 |
| 2012/0120696 | A1 * | 5/2012 | Nishijima ........... | H02M 1/4208 |
| | | | | 363/126 |

* cited by examiner

*Primary Examiner* — Jessica Han
*Assistant Examiner* — Lorena Bruner
(74) *Attorney, Agent, or Firm* — North Weber & Baugh LLP

(57) ABSTRACT

Various embodiments of the invention reduce switching losses associated with existing non-zero volt switching and non-zero current switching in DC/DC converters without the need for a resonant design. Certain embodiments of the invention provide for improved efficiency by reducing switching losses related to the simultaneous presence of current and voltage across high power switching devices. In certain embodiments, this is accomplished by adding a relatively small inductor and two switching elements to various switching regulator topologies. Energy stored in the inductor is used to transition the output of the switching converter to achieve zero volt switching and zero current switching.

20 Claims, 10 Drawing Sheets

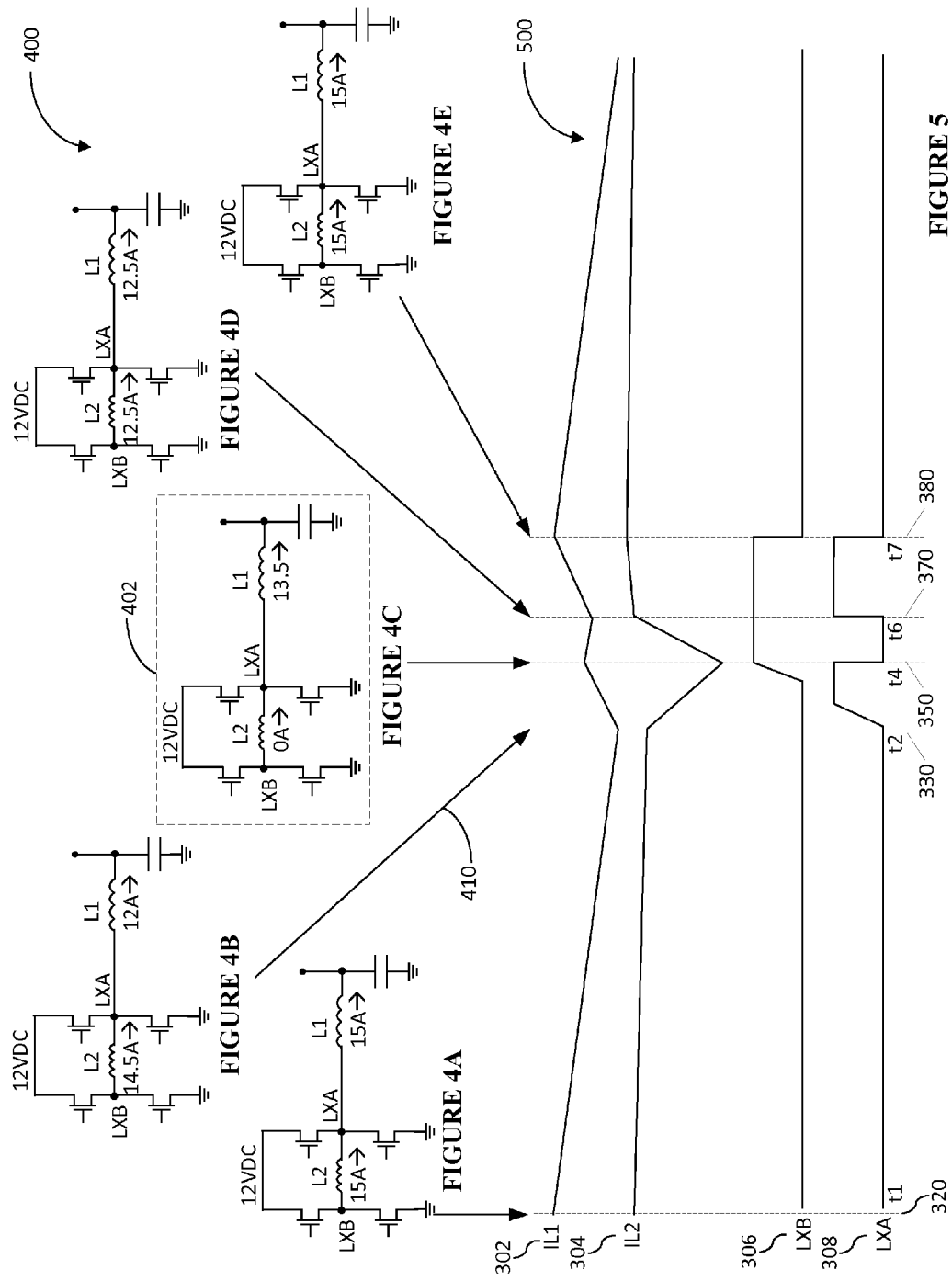

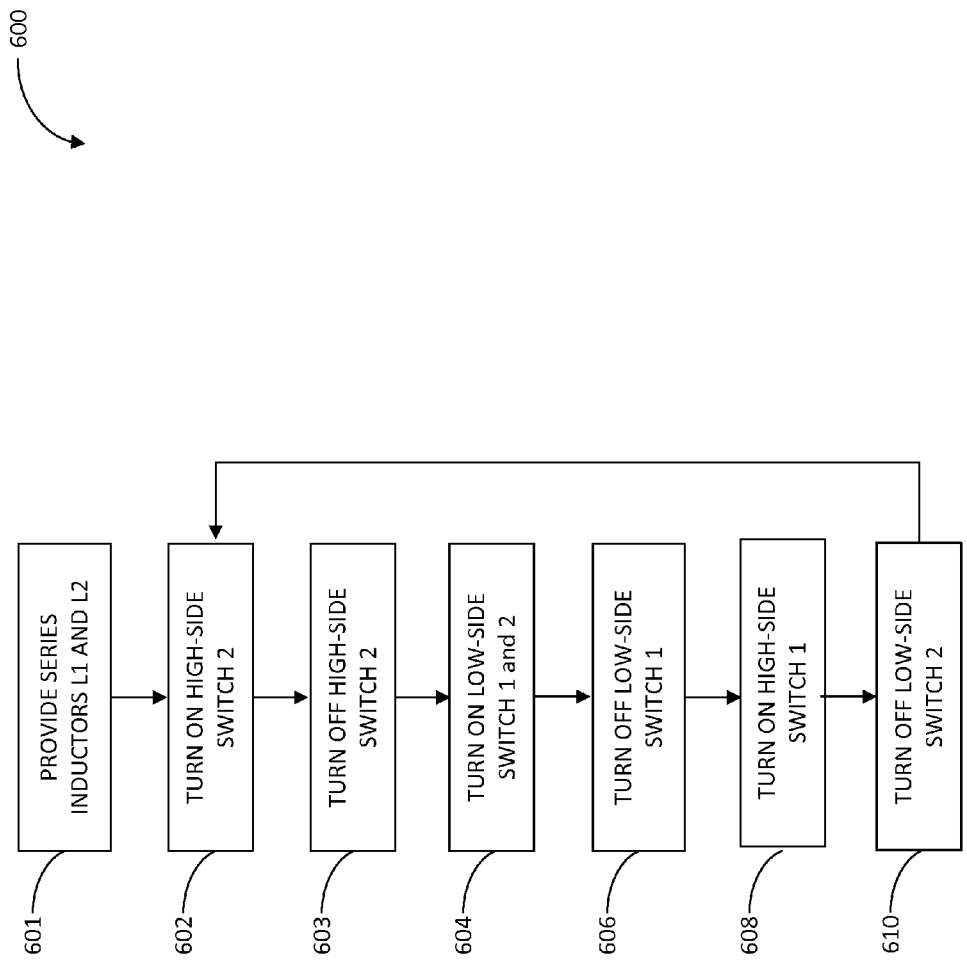

SYSTEM AND METHOD TO ELIMINATE TRANSITION LOSSES IN DC/DC CONVERTERS

BACKGROUND

A. Technical Field

The present invention relates to inductive switching converters and, more particularly, to systems, devices, and methods of utilizing zero-current and zero-voltage switching to reduce transition losses in DC/DC converters.

B. Background of the Invention

The electronics industry has continually demanded higher switching regulator efficiencies. Switching regulators transfer energy from a given input voltage level to a higher or lower output voltage level for delivery to a load. Inductive switching converters take advantage of in important physical property of inductors, the resistance to any changes to the current the inductor carries, in order to transform an input voltage to a desired output voltage. The level of the output voltage is adjusted by controlling the operation of active switching elements within the switching regulator.

Typical efficiencies of DC/DC converters have reached about 96%, such that a reduction of power losses by an additional one or two percent can reduce existing power losses by as much as 50%. Aside from conduction losses in the turned on active devices, which are typically transistor power switches, one major source of power dissipation in switching regulators are transition losses. There are two types of transition losses that occur during the switching process, the first type is capacitive loss resulting from charging and discharging a parasitic capacitance at the switching node of the converter. The second type of transition loss is conduction loss associated with turning on a power switch having a large voltage and non-zero inductor current present at the same time. This second type of transition loss is exacerbated by reverse recovery current in the power switch due to the body diode in the switch being forward biased.

Some existing approaches reduce switching power losses by avoiding transitions from a low voltage to a high voltage by applying zero voltage switching (ZVS) or zero current switching (ZCS) methods. In order to perform ZVS, by definition, the voltage across a switch needs to be at a near zero value at the time the switch is being turned on. However, existing ZVS or ZCS topologies have major drawbacks. For example, ZVS or ZCS buck converter topologies require (lossy) discontinuous current mode operation with average inductor current values that have to be approximately two times larger than the output current, as the inductor needs to reach zero for the switching regulator to actually perform ZVS or ZCS. A 10 A output current, for example, typically requires a 20 A peak current. Existing ZVS or ZCS topologies, by definition, require an inductor current that approaches zero, thus, conduction losses are typically more than twice as high as in continuous current buck converters that have very low ripple content. Alternative approaches address this problem by either employing resonant or critical conduction topologies. However, these approaches create more problems than they solve and do not result in higher system efficiency at higher ripple currents due to increased conduction losses associated with resonant or critical conduction topologies. What is needed are tools for switching regulator designers to overcome the above-described limitations.

SUMMARY OF THE INVENTION

Embodiments of the invention effectively eliminate losses associated with hard switching of power MOSFETs in various switching regulator topologies utilizing continuous current converter switching. Certain embodiments of the invention provide for reduced transition losses by employing a novel ZVS method that allows either voltage transitions to occur without activating the power MOSFET switch; a novel type of ZCS switching that allows current in a power MOSFET switch to be near zero prior to activating the switch, thereby, removing the loss factor of current in the switch while transitioning when voltage is present across the switch; and a novel type of switching that, herein, is referred to as Negative Current Switching (NCS), which terminology is not common to those skilled in the art. NCS allows for further reduction of switching losses by switching at a time when the current is flowing in the same direction that the switch is trying to move a voltage node coupled to the switch.

Certain embodiments of the invention allow to eliminate losses associated with body diode reverse recovery current in power MOSFET body diodes, thereby, eliminating the need for additional, fairly complex circuitry to minimize body diode reverse recovery currents.

In particular, in certain embodiments, zero volt switching and zero current switching is accomplished by adding a relatively low value inductor in series with a higher value inductor within a switching regulator; adding two switching devices to the output path; and timing all switching devices in a manner such as to cause the stored energy in the low value inductor to enable ZCS, NCS or transition the output node from one voltage to another voltage without power losses otherwise associated with resistive switches. In some embodiments, one high-side switch is operated to perform ZVS, while a second high-side switch is operated to selectively perform one of ZVS, NCS, or ZCS.

Certain features and advantages of the present invention have been generally described here; however, additional features, advantages, and embodiments presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4A through FIG. 4E illustrate exemplary current distributions between two series inductors of the buck converter circuit in FIG. 2, according to various embodiments of the invention.

FIG. 5 shows a partial view of timing diagram in FIG. 3.

FIG. 6 is a flowchart of an illustrative process for zero volt switching, zero current switching, or negative current switching, in accordance with various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention may be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the term "inductor" refers to any inductive element capable of storing magnetic energy, the term "capacitor" refers to any capacitive element capable of storing electric energy recognized by one of skilled in the art, and the term "switch" refers to any type of switching device recognized by one of skilled in the art. It is noted that timing diagrams herein are not drawn to scale and gate voltages are drawn relative to gate to source voltages and represent merely qualitative transitions between on and off states. Switches and their gate potentials are sometimes referred to interchangeably. Although only a selected number of circuit designs are shown and discussed, it is envisioned that the invention applies equally to other switching regulator topologies, such as forward converters, two-switch H-bridges, four-switch forward converters, etc. It is further noted that all references to ZCS equally applicable to NCS.

Figure 1A:
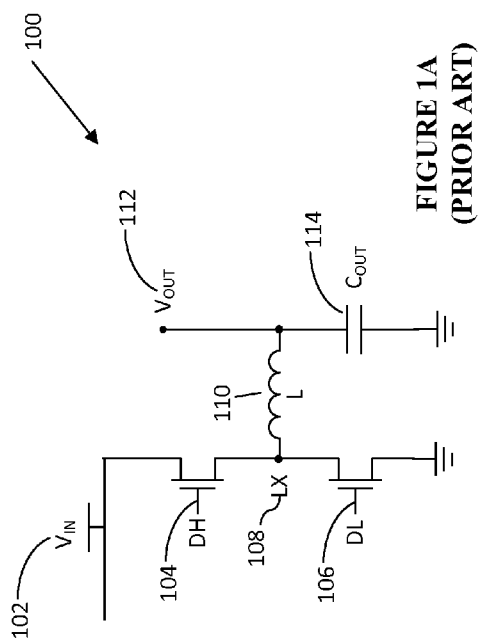
FIG. 1A is a schematic of a prior art buck converter.

FIG. 1A is a schematic of a prior art buck converter. Buck converter 100 is a step-down converter that is commonly used whenever the input voltage is greater than a desired load voltage. Buck converter 100 comprises voltage input terminal 102, high-side switch DH 104, low-side switch DL 106, inductor 110, and output capacitor $C_{OUT}$ 114. High-side switch DH 104, low-side switch DL 106, and inductor 110, are coupled to each other via voltage node LX 108. Since switching processes in buck converter 100 generate unwanted AC ripple noise, output capacitor $C_{OUT}$ 114 is placed at the output, such that output capacitor $C_{OUT}$ 114 and inductor 110 form a low-pass filter that functions to remove the noise from the output terminal $V_{OUT}$ 112 of buck converter 100 in order to obtain a DC voltage at the load that is coupled to the output terminal $V_{OUT}$ 112. The inductance value of inductor L 110 and capacitance value $C_{OUT}$ of output capacitor $C_{OUT}$ 114 are chosen to limit the ripple on $V_{OUT}$ 112 to an acceptable range that is determined by the requirements of the load and the feedback of buck regulator 100.

Control circuitry (not shown) controls the current flowing through inductor 110 by controlling the on time and off times of switches 104, 106, for example, via a PWM controller. The signal at output terminal $V_{OUT}$ 112 is typically fed back to an input of the PWM controller to adjust the $V_{OUT}$ accordingly.

As will be explained next, during switching events, switch 104 dissipates power due to the presence of current and voltage across it during the entire time the voltage at node LX 108 rises from a ground potential to the supply voltage $V_{IN}$ 102. In addition, a low-side body diode reverse recovery current causes losses within an intrinsic diode in switch 104 and large supply current spikes due to the sequence in which switches 104 and 106 are turned on and off in continuous mode. Therefore, in addition to dissipating heat caused by switching, buck converter 100 dissipates heat in the diode itself.

Figure 1B:
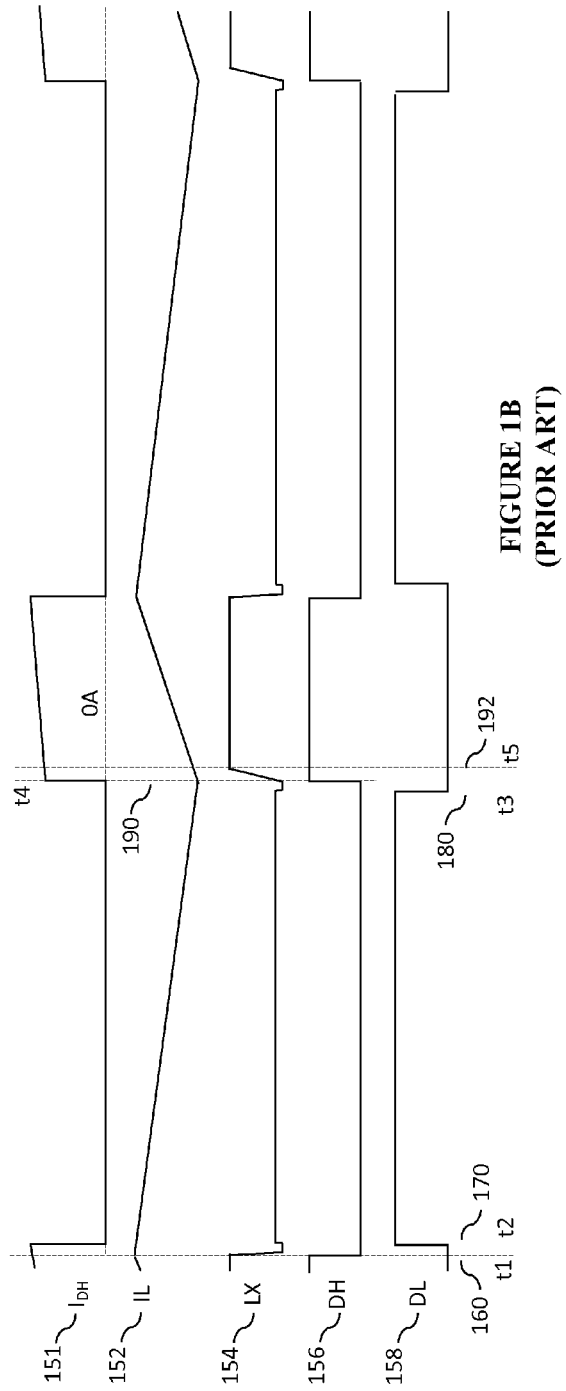
FIG. 1B illustrates a typical prior art timing diagram for the prior art buck converter of FIG. 1A.

FIG. 1B illustrates a typical prior art timing diagram for the prior art buck converter of FIG. 1A. In such conventional buck converters, high-side switch 156 turns off at time t1 160, which causes the voltage at node LX 154 to decrease toward zero, and inductor current $I_L$ 152 to decrease relatively slowly. A short time after the voltage at node LX 154 reaches zero, at time t2 170, low-side switch 158 is turned on. Since the voltage at node LX 154 is already near zero, low-side switch 158 switches with zero voltage due to the nature of the buck converter.

However, at the end of the "off time" of high-side switch 156, at time t4 190, when the output node of the switching regulator switches from a low state to a high state, high-side switch 156 turns on with a positive current $I_{DH}$ 151 that is equal to inductor current $I_L$ 152, while node LX 154 is still at ground potential. During this transition that high-side switch 156 turns on, current $I_{DH}$ 151 (typically the average output current) flows through the inductor and high-side switch 156 between t4 190 and time t5 192. As a result, switch 156 dissipates power due to the presence of current and voltage across it at the same time. This unnecessarily causes power dissipation in switch 156. Therefore, in order to increase efficiency and avoid switching losses associated with hard switching of high-side power MOSFETs, it would be desirable to have transitions occur without having voltage and current applied to power MOSFET switches at the same time.

Figure 2:
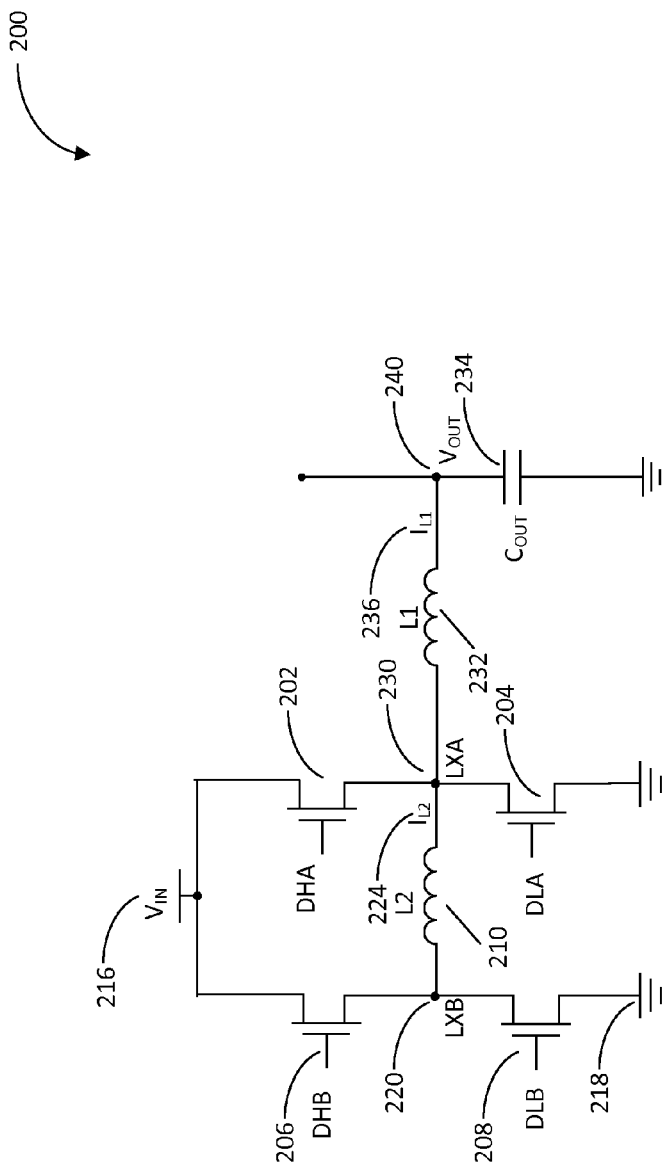
FIG. 2 is a schematic of an illustrative buck converter circuit utilizing, zero current switching, or negative current switching, according to various embodiments of the invention.

FIG. 2 is a schematic of an illustrative buck converter circuit utilizing zero volt switching, zero current switching, or negative current switching, according to various embodiments of the invention. Buck converter 200 comprises high-side switches DHA 202 and DHB 206, low-side switches DLA 204 and DLB 208, inductor 210, inductor 232, voltage input terminal 216, and output capacitor $C_{OUT}$ 234. High-side switch DHA 202 and low-side switch DLA 204 are coupled to each other at voltage node LXA 230, while high-side switch DHB 206 and low-side switch DLB 208 are coupled to each other at voltage node LXB 220. Inductor L1 232 and inductor L2 210 are coupled in a series configuration and comprise a common voltage node, here, LXA 230. Output capacitor $C_{OUT}$ 234 is coupled to output terminal 240 and inductor L1 232.

In one embodiment, inductor 210 is an inductive element that has an inductance value that is sufficiently low so as to be implemented into the lead-frame or a PCB trace coupled to buck converter 200. This reduces complexity of the inductor design as well as cost. The inductance of inductor 210 may be 20 nH or, for example, 10% of the inductance value of inductor 232. Switches DHA 202 and DLA 204 may be designed 1/10th of the size of switching devices DHB 206 and DLB 208, respectively. In one embodiment, low-side switches DLA 204 and DLB 208 may be implemented as Schottky diodes. Next, it will be explained how buck converter 200 is operated in such a manner that the energy stored in inductor 210 can be used to enable zero current switching or zero voltage switching of LXA 230 and LXB 220.

Figure 3:
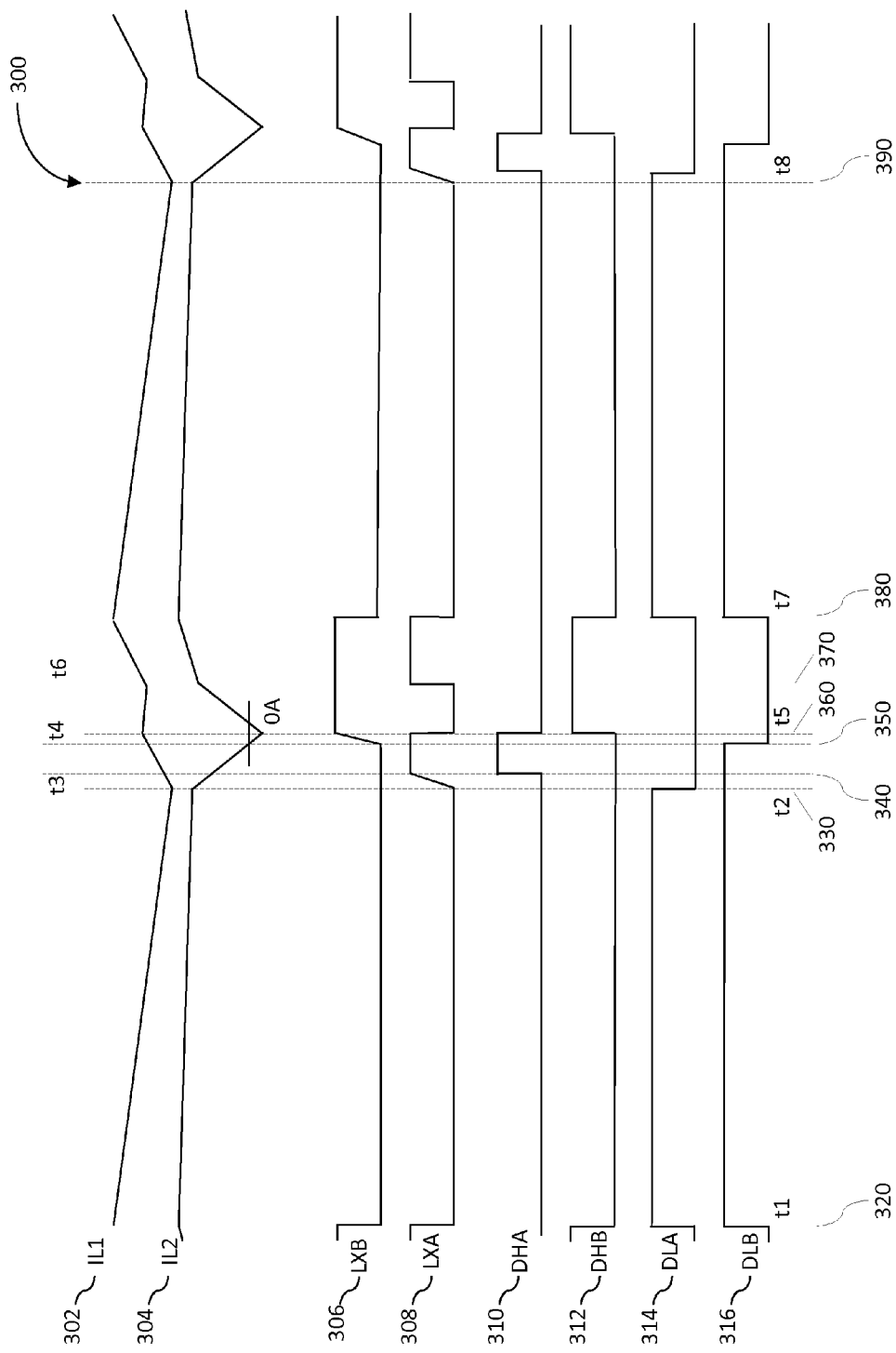
FIG. 3 illustrates an idealized version of a typical timing diagram for the buck converter circuit in FIG. 2, according to various embodiments of the invention.

FIG. 3 illustrates an idealized version of a typical timing diagram for the buck converter circuit shown in FIG. 2. Timing diagram 300 shows exemplary inductor currents $I_{L1}$ 302, $I_{L2}$ 304 and node voltages LXB 306 and LXA 308 as well as logic levels of gates 310-316. In one embodiment, as shown in example in FIG. 3, at time t1 320, currents $I_{L1}$ 302 and $I_{L2}$ 304 through inductors L1 and L2 (not shown), respectively, are about equal (e.g., 15 A). High-side switch DHB 312 on node LXB 306 is turned off first and then low-side switches DLA 314 and DLB 316 are turned on, and high-side switch DHA 310 on node LXA 308 remains turned off. As a result, switches DLA 314 and DLB 316 short to ground both terminals of the inductor carrying $I_{L2}$ 304 and cause significantly constant circulating currents to flow in inductor L2 as the voltage though inductor L2 and, thus, di/dt equals zero. In other words, during the off time of high-side switch DHA 314, the shorting to ground both sides of the smaller inductor causes the current in the smaller inductor to reduce only relatively slightly (e.g., from 15 A to 14.5 A) while the voltage across the inductor is approximately zero.

In contrast, since only one node of the inductor L1 is grounded, this allows current $I_{L1}$ 302 to continuously decrease by an amount representative of the system ripple (e.g., from 15 A to 12 A), such that toward the end of the off time of high-side switch DHA 310, at time t2 330, the smaller inductor L2 carries a greater current $I_{L2}$ 304 (e.g., 14.5 A) than the larger inductor L1 (e.g., 12 A). Once common node LXA 308 between the two inductors is released by turning off low-side switch DLA 314, due to the energy stored in the smaller inductor, the voltage at node LXA 308 automatically rises, for example, to a top rail voltage, i.e., to the supply voltage applied to the buck converter. In other words, by opening switch DLA 314, current $I_{L2}$ 304 in the inductor L2 forces the voltage on node LXA 308 to rise.

When the voltage at voltage node LXA 308 reaches the top rail voltage, here $V_{IN}$, high-side switch DHA 310 is turned on without any voltage across it, i.e., with zero volt switching. Since the voltage on node LXA 308 reaches the top rail voltage without turning on any switch that has voltage and current present at the same time, zero voltage switching is achieved and switching losses are avoided. After time t2 330, current $I_{L2}$ 304 in the inductor L2 rapidly diminishes to 0 A or below.

In one embodiment, once current $I_{L2}$ 304 reaches zero at time t4 350, the status of switch DLB 316 changes from closed to open. This couples the input voltage to output voltage via the inductor L1 232, which allows node LXB 306 to rise and reach a value equal to the top rail voltage at time t5 360. Since the voltage on node LXB 306 rises before switch DHB 312 is turned on at time t5 360, the transition of switch DHB 312 occurs without any voltage drop or current present. As a result, zero-volt switching is achieved also on switch DHB 312 and switching losses are successfully avoided. After switch DHB 312 is turned on, switch DHA 310 is turned off allowing node LXA 308 to fall due to the imbalance of the currents in the two inductors. In one embodiment, prior to LXB 306 rising another method of implementing this invention would be to turn on DHB 312 while LXB is near ground and force ZCS or NCS.

At time t6 370, once current $I_{L2}$ 304 reaches the same value as current $I_{L1}$ 302 (e.g., 12.5 A), the voltage at node LXA 308 increases to a value that is slightly lower than the voltage at node LXB 306. At this time the two inductors are in series with the output and the current flowing through both inductors ramps up while delivering increasing current to the output. At time t7 380, switch DHB 312 turns off, opening the direct current path from the input of the buck converter through the series inductors to the output. Turning on low-side switches DLA 314 and DLB 316 allows both node voltages LXA 308 and LXB 306 to fall to ground. After LXB 306 falls below ground and then forward biases the body diode of switch DLB 316, DLB 316 and DLA 314 turn on shorting out the inductor L2. Current $I_{L2}$ 304 remains relatively constant while current $I_{L1}$ 302 starts to decrease, such that both currents begin to drift apart again and being the cycle anew.

In one embodiment, not shown in FIG. 3, LXB 306 transitions high when DHB 312 turns on and employs ZCS instead of ZVS. At time t4 340, switch DHB 312 is turned on and the switching of node LXB 306 employs ZCS as the sum of the currents in both inductors is greater than or equal to zero. In this ZCS example, switching is NCS since the sum of the currents is negative (e.g., 12A-14.5 A=−2.5 A). NCS does provide the benefits of ZCS even if switching does not occur exactly at zero current. Switch DHB 312 charges an intrinsic parasitic capacitance with a parasitic current and carries load current $I_{L1}$ 302 during the transition. The negative current $I_{L2}$ 304 subtracts from the parasitic current associated with charging and discharging parasitic capacitances. However, overall system losses are not necessarily reduced by the additional reduction of losses in the switch using NCS since current $I_{L2}$ 304 and the parasitic current do not entirely cancel each other because the amount of energy required to enable negative current switching to turn the parasitic current negative is equal to the reduction of losses gained from charging or discharging of the parasitic capacitance. Therefore, the reduction in losses employing NCS and ZCS are substantially equal.

It is noted that any level shifting voltages have been excluded from FIG. 3 and other timing diagrams herein. Gate voltages 310-316 represent qualitative transitions between the on and off state of each switch. Since the timing diagram is not drawn to scale, currents $I_{L1}$ 302 and $I_{L2}$ 304 appear different in the between times t6 370 and t8 390 but in fact are equal. In practice, current $I_{L2}$ 304 may transition to a relatively large negative value. For example, current 304 may reach a negative value that has an amplitude equal to its positive amplitude. Current $I_{L2}$ 304 may assume any value that is suitable to cause voltage node LXB 306 to rise.

One of ordinary skill in the art will appreciate that absolute values can be manipulated, for example, via level shifting devices. It is understood that additional circuit components, such as noise suppression elements or controllers, such as a duty cycle controller, are employed to aid in the operation of the invention. One skilled in the art will also appreciate that a controller may control the output voltage with various methods, including duty cycle control and frequency control of high-side switches and low-side switches.

FIG. 4A through FIG. 4E illustrate exemplary current distributions between two series inductors of the buck converter circuit in FIG. 2, according to various embodiments of the invention. The schematics show various conditions that buck converter 402 assumes. Arrows 410 indicate how the conditions align with the timing diagram in FIG. 5. FIG. 5 shows a partial view of timing diagram in FIG. 3. For purposes of clarity, only the timing events for the currents and gate voltages are shown in FIG. 5.

FIG. 6 is a flowchart of an illustrative process to perform zero volt switching, zero current switching, or negative current switching, in accordance with various embodiments of the invention. The process starts at step 601 when two inductors L1 and L2 that are coupled in a series configuration are provided. Each inductor comprises an inductance value that is typically different from the other.

At step 602, a second high-side switch is turned on to establish a relatively equal current in both inductors.

At step 603, the second high-side switch is turned off, for example, in response to a control loop that regulates the output voltage.

At step 604, both low side switches are turned on this in affect inductor L2 is short circuited, for example, via ground in order to maintain a relatively constant current flow through inductor L2.

At step 606, a first low-side switch is turned off, for example, in response to a control loop that regulates an output voltage.

At step 608, a first high-side switch is turned on, for example, in response to a voltage at one terminal of the first high-side switch reaching an input voltage, thereby, making the switching event a zero-voltage switching.

Finally, at step 610, a second low-side switch is turned off enabling zero current or zero voltage switching, and then the loop continues by going back to step 602

It will be appreciated by those skilled in the art that fewer or additional steps may be incorporated with the steps illustrated herein without departing from the scope of the invention. No particular order is implied by the arrangement of blocks within the flowchart or the description herein.

Figure 7:
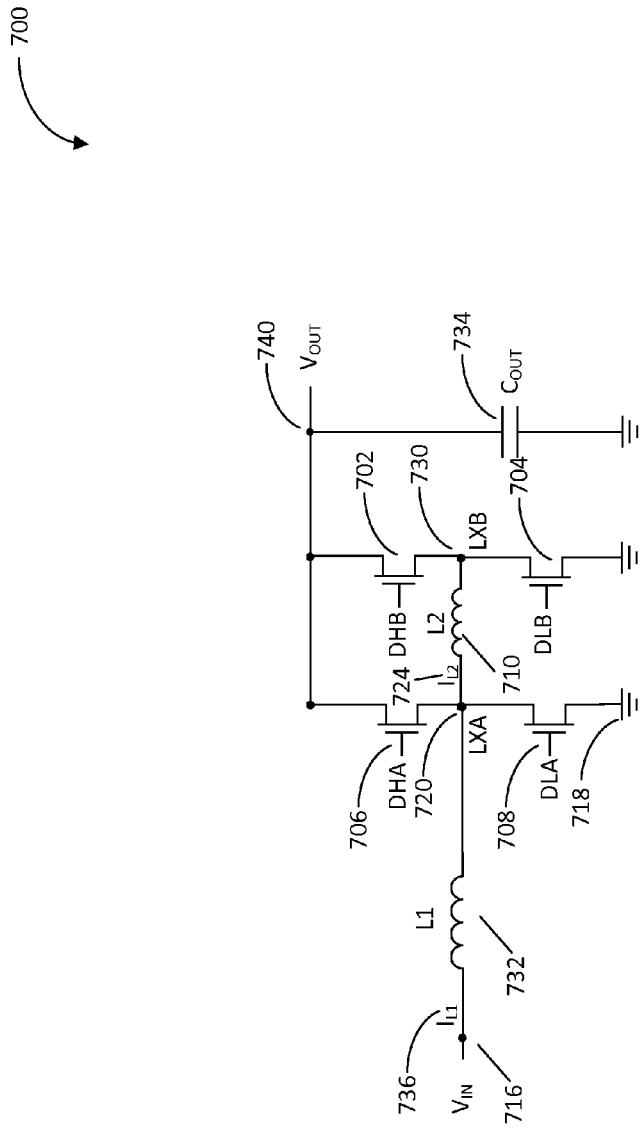
FIG. 7 is a schematic of an illustrative boost converter circuit utilizing zero volt switching, zero current switching, or negative current switching, according to various embodiments of the invention.

FIG. 7 is a schematic of an illustrative boost converter circuit utilizing zero volt switching, zero current switching, or negative current switching, according to various embodiments of the invention. Boost converter 700 is a step-up converter that is commonly used whenever the input voltage is lower than the desired load voltage. Boost converter 700 comprises high-side switches DHA 706 and DHB 702, low-side switches DLA 708 and DLB 704, inductor 710, input terminal 716, output terminal 740, and output capacitor $C_{OUT}$ 734. High-side switch DHA 706 and low-side switch DLA 708 are coupled to each other at voltage node LXA 720, while high-side switch DHB 702 and low-side switch DLB 704 are coupled to each other at voltage node LXB 730. Inductor L1 732 is coupled to input terminal 716. Output capacitor $C_{OUT}$ 734 is coupled to output terminal 740. Inductor L1 732 and inductor L2 710 are coupled in a series configuration and comprise common voltage node LXA 230. In one embodiment, high-side switches DHA 706 and DHB 702 may be implemented as Schottky diodes. One of ordinary skill in the art will appreciate that in boost converter 700 voltages on nodes LXA 720 and LXB 730 are higher than the voltage at input terminal 716.

Figure 8:
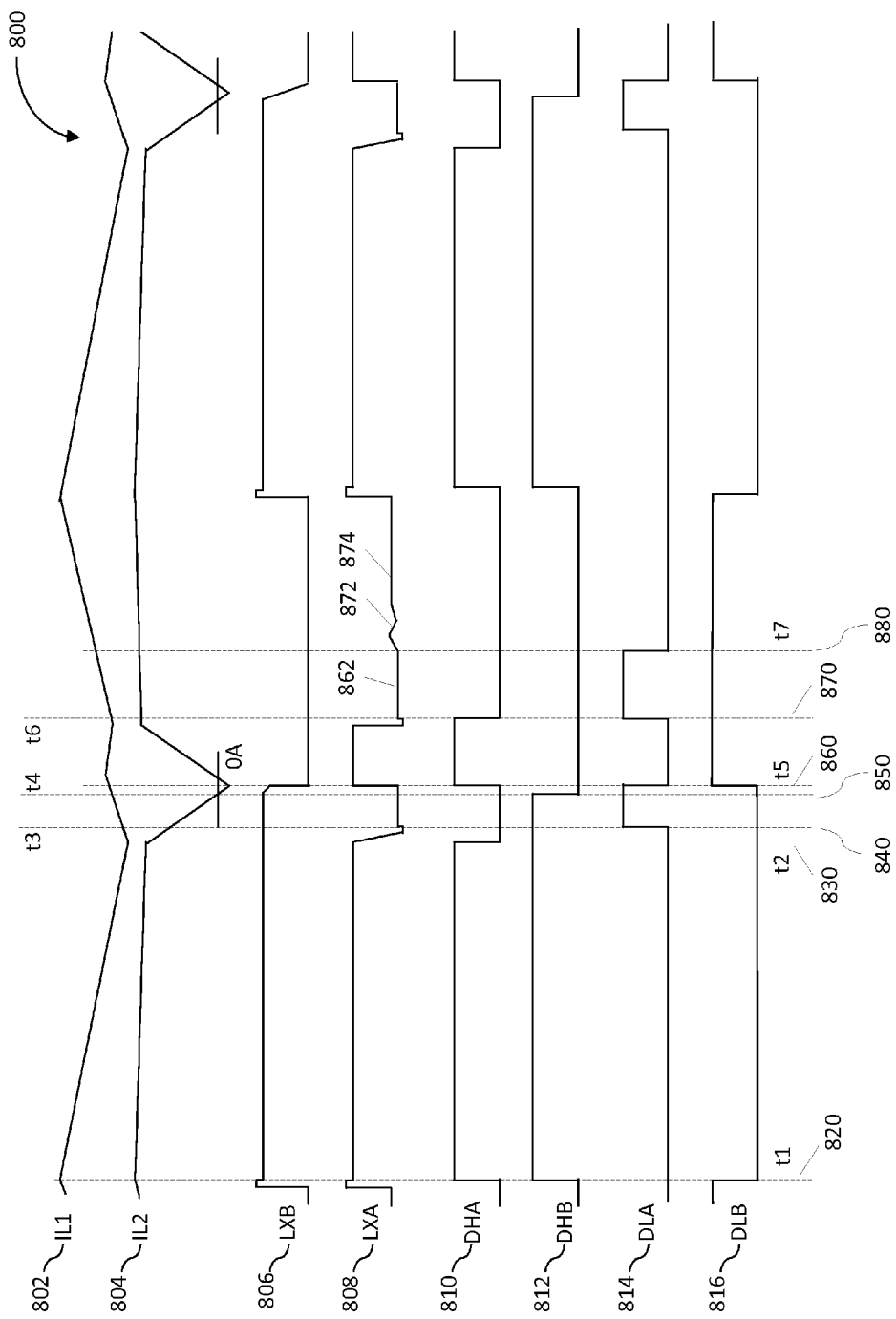
FIG. 8 illustrates a typical timing diagram for the boost converter circuit in FIG. 7, according to various embodiments of the invention.

FIG. 8 illustrates a typical timing diagram for the boost converter circuit in FIG. 7, according to various embodiments of the invention. FIG. 8 illustrates a more realistic timing diagram than the timing diagram in FIG. 3. Timing diagram 800 shows exemplary inductor currents $I_{L1}$ 802, $I_{L2}$ 804, LXB 806, and LXA 808, and gate voltages 810-816. Various glitches, such as glitch 818 that occurs on LXA 808 and LXB 806 just before time t1 820 result from the effect of turning off a current flowing in an inductor with a switch. Since the body diodes stop the current in the inductor from continuing to flow, the current can only reach one body diode voltage above the input voltage $V_{IN}$ or one body diode voltage below ground potential (typically 0 V).

Prior to the transition at time t1 820, the only switch active between the input voltage $V_{IN}$ and ground potential is switch DLB 816, such that the only connection between $V_{IN}$ and ground is switch DLB 816 and inductors L1 and L2 (not shown). Currents $I_{L1}$ 802 and $I_{L2}$ 804 through inductors L1 and L2 are substantially equal when at time t1 820 low-side switch DLB 816 on node LXB 806 is turned off, both high-side switches DHA 810 and DHB 812 are turned on simultaneously, and high-side switch DHA 810 on node LXA 808 remains turned off. As a result, switches DHA 810 and DHB 812 short the inductor carrying $I_{L2}$ 804 and cause significantly constant circulating currents to flow in inductor L2, while $I_{L1}$ 802 decreases relatively rapidly. Note that as before, $I_{L1}$ 802 is only a ripple current and is not drawn to the same scale as $I_{L2}$ 804.

Next, at time t2 830, switch DHA 810 is turned off, i.e., node LXA 808 between the two inductors L1 and L2 is turned off. Since current $I_{L2}$ 804 in the smaller inductor is larger than current $I_{L1}$ 802 in the larger inductor L1, inductor L2 transitions the energy stored in the smaller inductor to the parasitic capacitance on node LXB and forces the voltage at node LXA 808 below ground. When the voltage at voltage node LXA 808 reaches zero, low-side switch DLA 814 is turned on at time t3 840 without any voltage across it, i.e., with zero volt switching. Since the voltage on node LXA 808 reaches the fall to zero without turning on any switch that has either a voltage or a current present at the same time, zero voltage switching is achieved and switching losses are successfully avoided.

In one embodiment, when switch DHA 810 is turned on at time t5 860, ZCS or NCS is employed since the current in the two inductors cause $I_{L2}$ 804 to be equal or less than zero. ZCS and NCS provide comparable efficiency savings when compared to ZVS, because the power loss in inductor L1 resulting from NCS is similar to the power loss resulting from the transition with ZCS.

As in the buck configuration, after time t2 830, current $I_{L2}$ 804 in the inductor L2 rapidly diminishes to 0 A or below.

Once current $I_{L2}$ 804 reaches zero, at time t4 850, the status of switch DHB 812 is allowed to change from closed to open after which time the voltage on LXB 806 decays relatively little, until, at time t5 860, switch DLB 816 turns on and connects LXB 808 to ground potential. At that point the voltage on LXB 806 rapidly drops toward zero and employs ZCS or NCS on DHA 810 due to current $I_{L2}$ 804 being equal or less than zero.

Between t6 870 and t7 880, DLA 814 is turned on. Once DLA 814 is turned off at time t7 880, currents in $I_{L1}$ 1002 and $I_{L2}$ 1004 are allowed to equalize. Stray capacitances present in the inductors may cause a temporary ringing effect 872 that decays relatively rapidly as shown in FIG. 8, until node voltage LXA 808 settles to a common voltage 874 that is slightly lower than voltage 862 due to the fact that node voltage LXA 808 is not tied to either switch DHA 1010 or DLA 1014, but floating between two series inductors L1 and L2. The amplitude of voltage 874, i.e., the value below the supply voltage $V_{IN}$ to which voltage node LXA 808 adjusts is determined by the ratio of the inductances of L1 and L2. For example, if the ratio is 10:1, node voltage LXA 808 would increase by 10% relative to ground. If inductors L1 and L2 had equal inductances, the increase would be 50%, etc. Then, at time t8 890 when currents $I_{L1}$ 802 and $I_{L2}$ 804 are substantially equal again, the cycle repeats.

Figure 9:
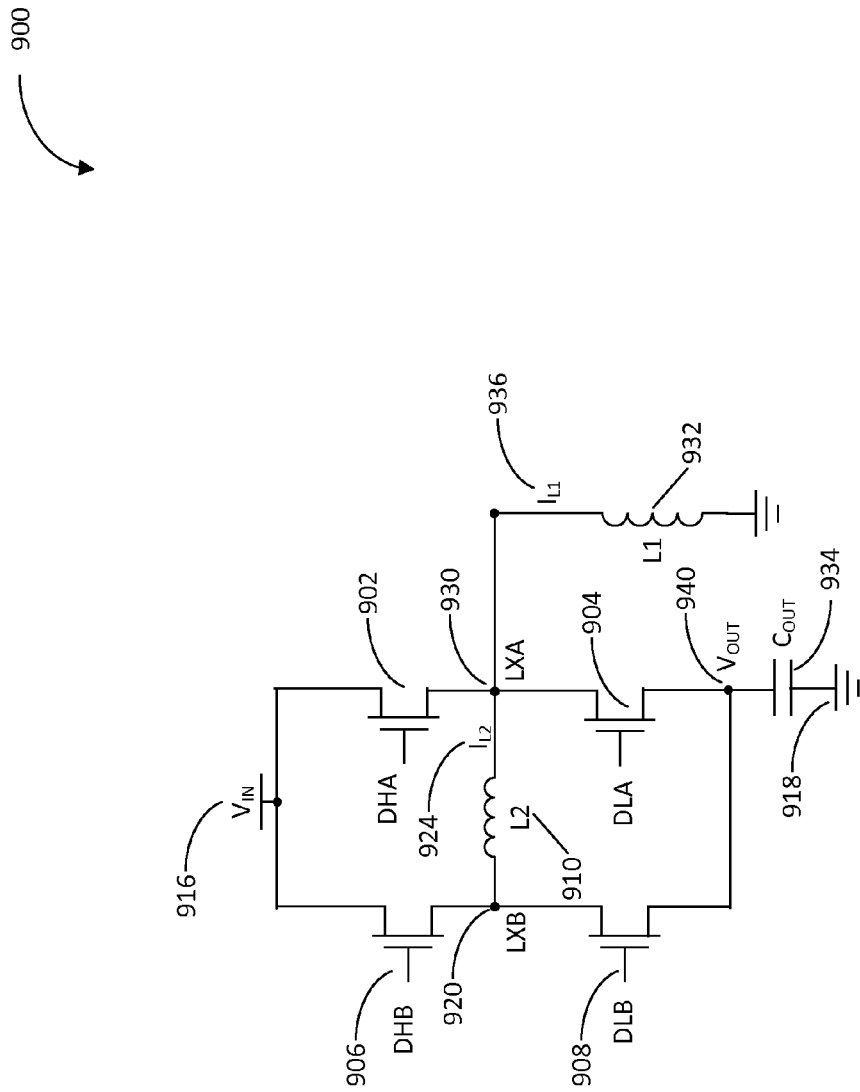
FIG. 9 is a schematic of an illustrative buck-boost converter circuit utilizing zero volt switching, zero current switching, or negative current switching, according to various embodiments of the invention.

FIG. 9 is a schematic of an illustrative buck-boost converter circuit utilizing zero volt switching, zero current switching, or negative current switching, according to various embodiments of the invention. Buck-Boost converter 900 comprises high-side switches DHA 902 and DHB 906, low-side switches DLA 904 and DLB 908, inductor 910, voltage input terminal 916, and output capacitor $C_{OUT}$ 934. High-side switch DHA 902 and low-side switch DLA 904 are coupled to each other at voltage node LXA 930, while high-side switch DHB 906 and low-side switch DLB 908 are coupled to each other at voltage node LXB 920. Inductor L1 932 and inductor L2 910 are coupled in a series configuration and comprise a common voltage node LXA 930. Output capacitor $C_{OUT}$ 934 is coupled to output terminal 940 of output capacitor 934. In example in FIG. 9, buck-boost converter 900 operates as an inverting converter.

Figure 10:
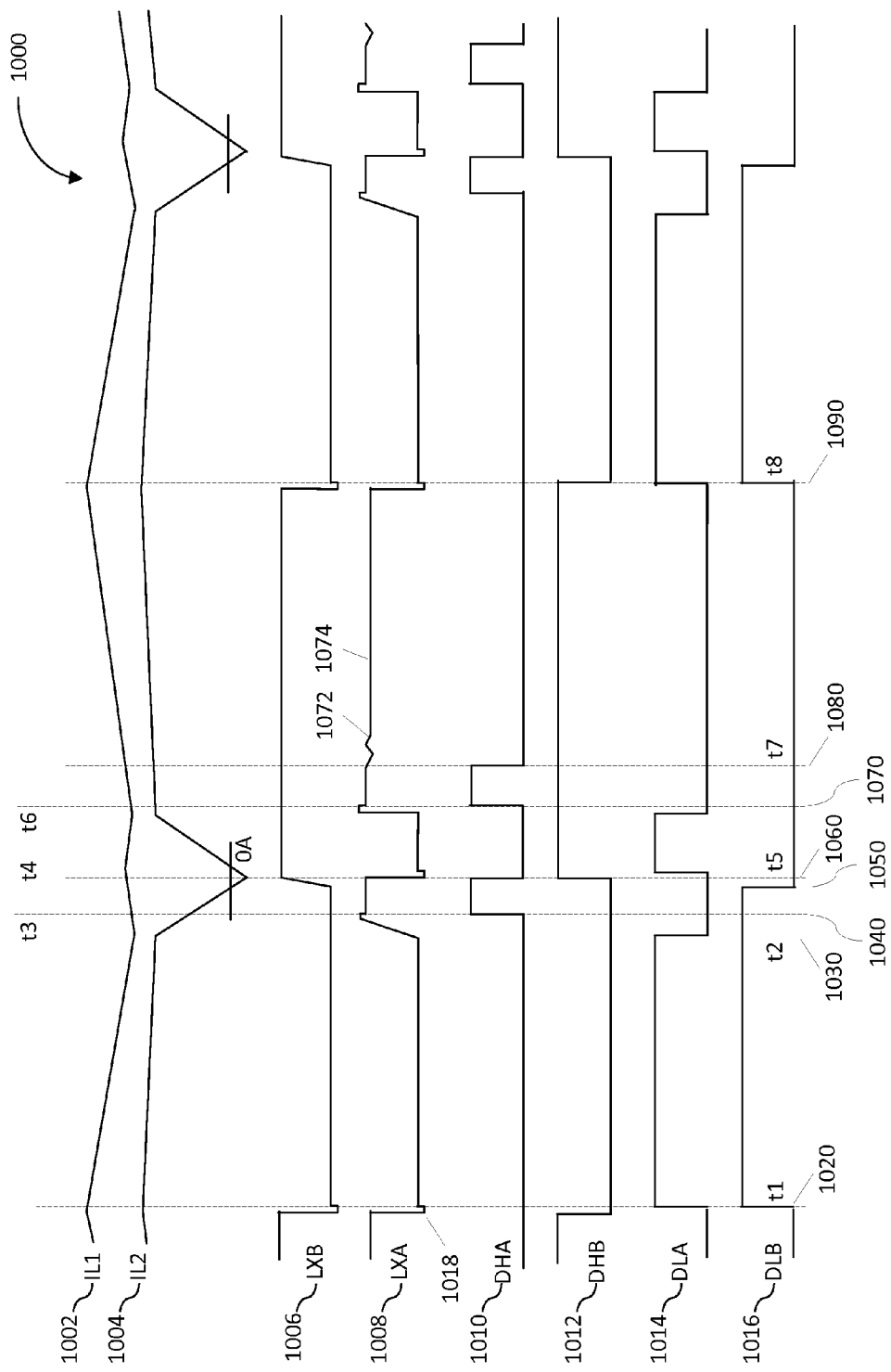
FIG. 10 illustrates a typical timing diagram for the buck-boost circuit in FIG. 9, according to various embodiments of the invention.

FIG. 10 illustrates a typical timing diagram for the buck-boost circuit in FIG. 9, according to various embodiments of the invention. Similar to the buck converter timing diagram in FIG. 3, timing diagram 1000 in FIG. 10 shows exemplary inductor currents $I_{L1}$ 1002, $I_{L2}$ 1004 and gate voltages 1006-1016. In example in FIG. 10, prior to time t1 1020, the only switch that is active is switch DHB 1012, such that the only connection between $V_{IN}$ and ground is switch DHB 1012 in series with inductors L2 and L1. As a result, the current flows from $V_{IN}$ through both inductors, such that the current through both inductors are equal.

At time t1 1020, currents $I_{L1}$ 1002 and $I_{L2}$ 1004 through inductors L1 and L2 are about equal. Following glitch 1018 of about one diode voltage below ground in both LXA 1006 and LXB 1008, high-side switch DHB 1012 is turned off and low-side switches DLA 1014 and DLB 1016 are turned on. As a result, current $I_{L2}$ 1004 is shorted out and circulates through inductor L2 with relatively constant amplitude, as shown in FIG. 10. As in the buck converter configuration in FIG. 2, since only one node of inductor L1 is grounded, current $I_{L1}$ 1002 continuously decays at a relatively faster rate than $I_{L2}$ 1004, such that by time t2 1030, inductor L2 carries a greater current $I_{L2}$ 1004 than the inductor L1.

When common node LXA 1008 between the two inductors is released by opening low-side switch DLA 1014, at time t2 1030, the energy stored in the smaller inductor L2 causes the voltage at node LXA 1008 to rise to $V_{IN}$, while current $I_{L2}$ 1004 in the inductor L2 rapidly diminishes to 0 A or below. Transitioning the energy from inductor L2 allows node LXA 1008 to rise toward the top rail voltage. As a result, at time t3 1040, after another short glitch to about one diode voltage above $V_{IN}$, switch DHA 1010 turns on with zero voltage switching without experiencing switching losses. In one embodiment, DHA 1010 is turned on shortly after time t2 1030 to employ NCS since node LXA 1008 has negative current at time t2 1030.

Next, at time t4 1040, when current $I_{L2}$ 1004 reaches zero, switch DLB 1030 is turned off. This allows voltage node LXB 1006 to rise to $V_{IN}$, which allows DHB 1012 to transition with zero voltage switching shortly after t5 1060 when LXA 1008 falls below ground potential. In other words, each high-side switch DHA 1010 and DHB 1012 transitions with zero voltage switching at its respective voltage node.

When DHA 1010 is turned off at t7 1080, currents 1002 and $I_{L2}$ 1004 in L1 and L2 can equalize. Stray capacitances associated with inductors L1 and L2 can cause a temporary ringing 1074, until the voltage at node LXA 1008 settles to common voltage 1074. Common voltage 1074 is slightly lower than before time t7 1080 since node voltage LXA 1008 is not tied to either switch DHA 1010 or DLA 1014, but floating between two series inductors L1 and L2. Similar to the boost converter in FIG. 7, the value below the supply voltage $V_{IN}$ to which voltage node LXA 1008 adjusts is determined by the ratio of the inductances of L1 and L2. Finally, at time t8 1090 when currents $I_{L1}$ 1002 and $I_{L2}$ 1004 are substantially equal again, the cycle repeats.

Figure 11:
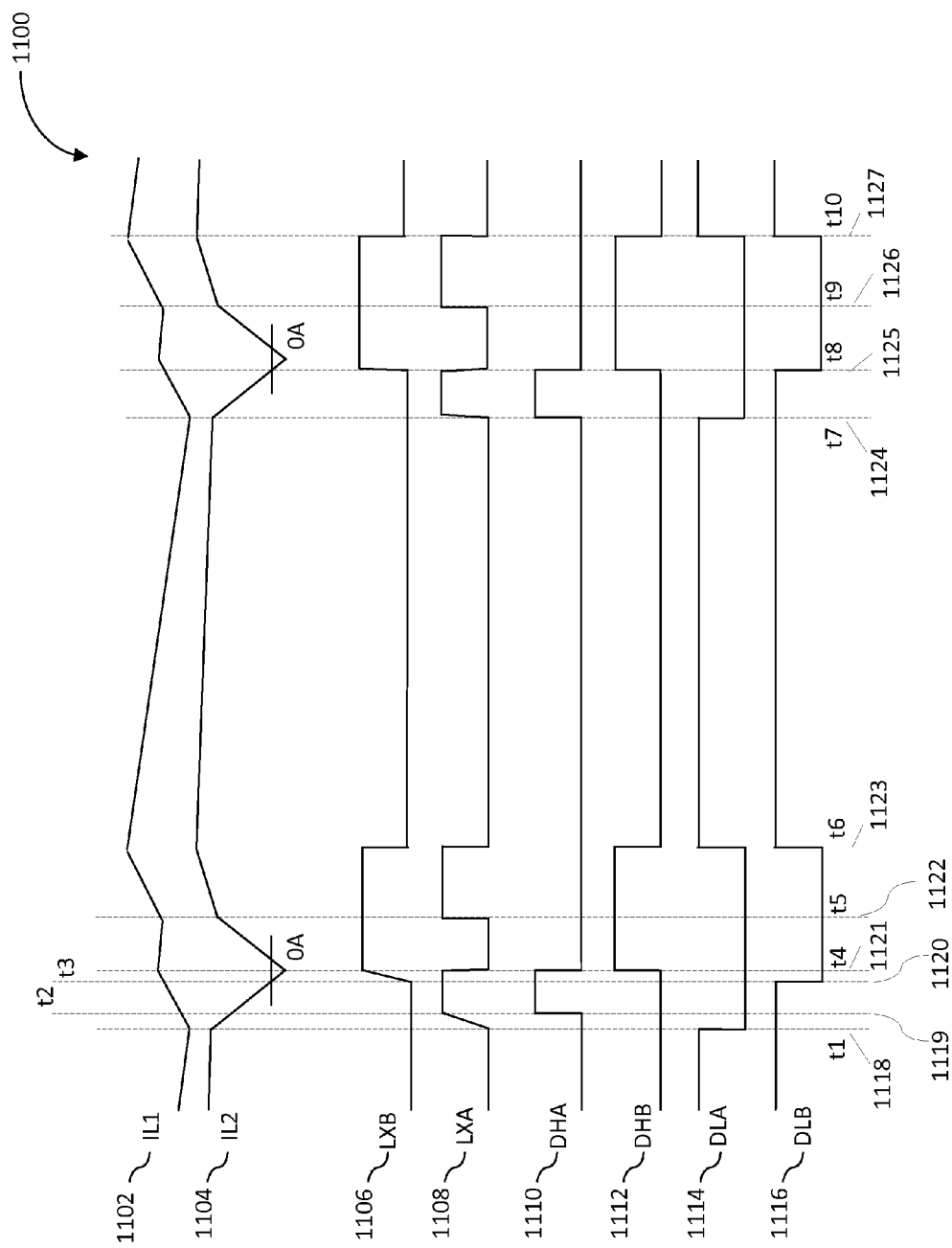
FIG. 11 illustrates a typical timing diagram for the buck circuit in FIG. 2, utilizing zero voltage switching and zero current switching, according to various embodiments of the invention.

FIG. 11 illustrates a typical timing diagram for the buck circuit in FIG. 2, utilizing zero voltage switching and zero current switching, according to various embodiments of the invention. The switching period form t1 1118 to time t6 1123 employs ZVS. During this phase, switches DHA 1110 and DHB 1112 transition to a high state at time t2 1130 and t4 1121, respectively, when the voltage across the respective switch is near or equal to zero. The switching period form time t7 1124 to time t10 1127 employs NCS and ZCS. During this phase, switch DHA 1110 transitions high when the current flowing through the switch is negative due to the difference in inductor currents $I_{L1}$ 1102 and $I_{L2}$ 1104. As illustrated in FIG. 11, DHB 1112 transitions high with ZCS at time t8 1125 when current $I_{L2}$ 1104 in the switch crosses zero. The system efficiency of these two different types of switching have similar efficiencies that exceed existing switching schemes.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

What is claimed is:

1. A switching regulator comprising:
    a first inductor comprising a first terminal coupled to a first voltage node;
    a second inductor coupled to the first voltage node to create a series configuration the first inductor, the second inductor coupled to a second terminal;
    a first low-side switch coupled to the first terminal;

a first high-side switch coupled to the first terminal;
a second low-side switch coupled to the second terminal; and
a second high-side switch coupled to the second terminal, the one or more switches being controlled by a controller to cause the second inductor to release energy to the first voltage node to facilitate zero-voltage switching.

2. The switching regulator according to claim 1, further comprising a second voltage node coupled to the second inductor, the first and second low-side switches and the first and second high-side switches are controlled in a manner so as to facilitate zero-voltage switching at the first voltage node, and one of zero-voltage switching and zero-current at the second voltage node.

3. The switching regulator according to claim 1, wherein the first low-side switch is coupled between the first inductor and a ground potential, the first low-side switch turns off in response to a first current in the first inductor falling below a second current flowing in the second inductor.

4. The switching regulator according to claim 1, wherein the first high-side switch is coupled between the first inductor and an input voltage, the first high-side switch turns on in response to a first voltage at a first terminal of the first high-side switch reaching the input voltage.

5. The switching regulator according to claim 1, wherein the first inductor, the first low-side switch, and the first high-side switch are coupled in one of a buck, boost, or buck-boost configuration.

6. The switching regulator according to claim 1, wherein at least one of the first low-side, the second low-side switch, the first high-side switch, and the second high-side switch is a Schottky diode.

7. A method to perform transition loss free switching, the method comprising:
    converting a first voltage to a second voltage via a first inductor, the first inductor being coupled in a series configuration with a second inductor and sharing a voltage node;
    storing energy in the second inductor by short-circuiting the second inductor to maintain a substantially constant current flow through the second inductor; and
    operating one or more switches so as to release energy from the second inductor to the voltage node to facilitate zero volt switching of at the voltage node.

8. The method according to claim 7, wherein the voltage node is coupled between the first inductor and the second inductor.

9. The method according to claim 7, wherein operating the one or more switches occurs in response to the voltage node transitioning from a low voltage to a high voltage.

10. The method according to claim 7, wherein operating the one or more switches occurs in response to a current flowing through the one or more switches being equal to or less than zero.

11. The method according to claim 7, wherein operating the one or more switches further comprises:
    turning off a first low-side switch;
    turning on a first high-side switch to drive the second inductor;
    turning off a second low-side switch; and
    turning on a second high-side switch to drive the first inductor.

12. The method according to claim 11, wherein the turning off of the second low-side switch occurs in response to a second current flowing in the second inductor being significantly equal to zero.

13. The method according to claim 11, wherein the turning off of the first low-side switch occurs in response to a first current flowing through the first inductor falling below a second current flowing through the second inductor.

14. The method according to claim 11, wherein the turning on of the first high-side switch occurs in response to a first voltage at a first terminal of the first high-side switch reaching a first input voltage.

15. The method according to claim 11, wherein turning on the second high-side switch occurs in response to a second voltage at a second terminal of the second high-side switch reaching a second input voltage.

16. A switching regulator system to perform transition loss free switching, the system comprising:
    a first inductor comprising a first terminal coupled to a first voltage node;
    a second inductor coupled to the first voltage node to create a series configuration with the first inductor, the second inductor coupled to a second terminal of the second inductor;
    a first low-side switch coupled to the first terminal;
    a first high-side switch coupled to the first terminal;
    a second low-side switch coupled to the second terminal;
    a second high-side switch coupled to the second terminal, each of first low-side switch, first high-side switch, second low-side switch, and second high-side switch comprising a gate;
    a first voltage node coupled to the first and second inductor, one or more switches being controlled to cause the second inductor releases energy to the first voltage node to facilitate zero-voltage switching;
    a voltage source coupled to provide a voltage to at least one of the first inductor and the second inductor; and
    a switch controller to control at least one of the gates of the first low-side switch, first high-side switch, second low-side switch, and second low-side switch.

17. The switching regulator system according to claim 16, wherein the second high-side switch is turned off in response to a control loop that regulates an output voltage.

18. The switching regulator system according to claim 16, wherein the first low-side switch is turned off in response to a current flow at the first voltage node.

19. The switching regulator system according to claim 16, wherein the first inductor, the first low-side switch, and the first high-side switch are coupled in one of a buck, boost, or buck-boost configuration.

20. The switching regulator system according to claim 16, wherein at least one of the first low-side switch, the first high-side switch, the second low-side switch, and the second low-side switch is a MOSFET device.

* * * * *